United States Patent
Tunzini et al.

(10) Patent No.: US 10,105,755 B2
(45) Date of Patent: Oct. 23, 2018

(54) COMPOSITE CASTING PART

(71) Applicants: GF Casting Solutions Mettmann GmbH, Mettmann (DE); GF Casting Solutions Singen GmbH, Singen (DE); GF Casting Solutions Herzogenburg Iron GmbH, Herzogenburg (AT); GF Casting Solutions Leipzig GmbH, Leipzig (DE); Georg Fischer Automotive (Kunshan) Co Ltd, Kunshan City (CN)

(72) Inventors: Sabine Tunzini, Hemishofen (CH); Thomas Baginski, Leipzig (DE)

(73) Assignees: GF Casting Solutions Mettmann GmbH, Mettmann (DE); GF Casting Solutiongs Singen GmbH, Singen (DE); GF Casting Solutions Herzogenburg Iron GmbH, Herzogenburg (AT); GF Casting Solutions Leipzig GmbH, Leipzig (DE); Georg Fischer Automotive (Kunshan) Co Ltd, Kunshan (CN)

( * ) Notice: Subject to any disclaimer, the term of this patent is extended or adjusted under 35 U.S.C. 154(b) by 1078 days.

(21) Appl. No.: 14/330,232

(22) Filed: Jul. 14, 2014

(65) Prior Publication Data
US 2016/0008877 A1 Jan. 14, 2016

(51) Int. Cl.
*B22D 19/00* (2006.01)
*B22D 19/04* (2006.01)
(Continued)

(52) U.S. Cl.
CPC ......... *B22D 19/0081* (2013.01); *B22D 19/04* (2013.01); *B22D 19/16* (2013.01);
(Continued)

(58) Field of Classification Search
CPC .... B22D 19/00; B22D 19/0081; B22D 19/04; B22D 19/16
(Continued)

(56) References Cited

U.S. PATENT DOCUMENTS

| 3,433,282 A | 3/1969 | Crocker et al. |
| 5,429,173 A | 7/1995 | Wang et al. |
| 6,484,790 B1 | 11/2002 | Myers et al. |

FOREIGN PATENT DOCUMENTS

| DE | 19642838 A1 | 7/1997 |
| DE | 19650056 A1 | 6/1998 |

(Continued)

*Primary Examiner* — Kevin P Kerns
(74) *Attorney, Agent, or Firm* — Bachman & LaPointe, P.C.; William Slate

(57) ABSTRACT

A process produces a composite cast part containing an insert part and casting material. The insert part is integrally bonded to the casting material. The process includes: producing the insert part formed of an exothermic material; encapsulating or embedding the insert part; inserting the encapsulated/embedded insert part into a casting mold; filling the mold with molten mass; and flowing a casting material on the insert part. The exothermic material ignites through contact with the flowing casting material or as a result of the ignition temperature of the exothermic mass being reached, whereby a temperature gradient between the cast material solidifying molten mass the insert part is reduced.

14 Claims, 3 Drawing Sheets

(51) Int. Cl.
  *B22D 19/16* (2006.01)
  *B32B 15/01* (2006.01)
(52) U.S. Cl.
  CPC ............ *B32B 15/01* (2013.01); *B32B 15/012* (2013.01); *B32B 15/013* (2013.01)
(58) Field of Classification Search
  USPC .................................. 164/54, 75, 100, 101
  See application file for complete search history.

(56) References Cited

FOREIGN PATENT DOCUMENTS

| | | | | |
|---|---|---|---|---|
| DE | 10043105 B4 | 6/2007 | | |
| DE | 102006041901 A1 | 3/2008 | | |
| DE | 102007059771 A1 | 6/2009 | | |
| DE | 102011053858 B3 | 3/2013 | | |
| EP | 0659899 A1 | 6/1995 | | |
| EP | 0888199 A1 | 1/1999 | | |
| EP | 1050354 A1 | 11/2000 | | |
| EP | 1050358 A1 | 11/2000 | | |
| JP | 57187159 A | 11/1982 | | |
| JP | 5953641 A | 3/1984 | | |
| JP | 60174244 A | 9/1985 | | |
| JP | 63-16843 A | * | 1/1988 | ............. B22D 13/02 |
| JP | 2003-285149 A | * | 10/2003 | ............. B22D 13/10 |

* cited by examiner

COMPOSITE CASTING PART

BACKGROUND OF THE INVENTION

The invention relates to a process for producing a composite cast part containing an insert part and casting material, wherein the insert part is integrally bonded to the casting material.

The production of composite cast parts makes it possible to combine the preferred properties of the materials at the appropriate points. Thus, components can be assembled optimally according to their requirements and fields of use on account of the material combination. However, this requires an integral or metallurgical bond between the materials. When casting steel parts into cast iron or aluminium alloys, there is often the problem of an inadequate bond between the steel part cast in and the surrounding or cast-in material. The early solidification of the molten mass on account of the contact with the insert part at room temperature hinders a metallurgical or integral bond between the casting material and the steel part, as a result of which gaps can form between the composite partners.

DE 10 2006 041 901 A1 discloses a process for producing metallic composite parts made of steel and/or cast iron. In this process, the part to be cast in, which is produced from steel or cast iron, is coated by means of flux. The aim of the coating is to reduce the oxide skin of the cast-in part, that is to say that the oxide skin of the cast-in part is dissolved and washed away during the casting-in process, as a result of which the casting material can enter into a metallurgical bond.

DE 10 2011 053 858 B3 discloses a process for the use of a component which can be cast in a lost casting mould, wherein a coating agent is applied to a surface of the component to be cast in. The coating agent forms an actively separating surface which prevents the adhesion of the material on the component and also corrosion before encapsulation with casting material.

DE 100 43 105 B4 discloses a process for forming a strong, tough, resilient and/or at least substantially flawless bond between an insert and a casting metal material having a melting point below that of the insert material. The insert is coated with a thin layer of a metallic material which is selected from the group consisting of silver, antimony, bismuth, chromium, gold, lead, magnesium, silicon, tin, titanium and zinc. Thereafter, the casting material is cast against the coated surface of the insert. The coefficient of thermal expansion of the coating is greater than that of the insert and less than that of the casting material. The coated insert is moreover held at a temperature of at least 100° C. for a period of time of at least 5 minutes. As a result of this process, part of the coating should dissolve and be sacrificed to the casting metal material, while part of this coating remains as a diffusion barrier between the insert and the casting material, which should achieve a highly tough bond between the insert and the casting material.

It is an object of the present invention to provide a process and a corresponding composite cast part which, compared to the prior art, achieves an improved bond between an insert part and casting material and also ensures economical production.

SUMMARY OF THE INVENTION

According to the invention, this object is achieved by virtue of the fact that the encapsulation or embedding of the insert part is formed by an exothermic material which ignites through the contact with the inflowing casting material or as a result of the ignition temperature being reached. In the process, energy is released and discharged to the surroundings, as a result of which there is a reduced temperature gradient between the solidifying molten mass and the insert part.

The process according to the invention comprises the following steps:
producing the insert part,
encapsulating or embedding the insert part by means of exothermic material,
inserting the encapsulated/embedded insert part into the casting mould,
filling the mould with molten mass.

In addition to being used for welding (thermite welding mixtures), exothermic materials are also used in exothermic feeders for foundry purposes. The contact between the molten mass and the exothermic mass triggers a combustion reaction, this ensuring in the feeder that the molten mass solidifying last is located there and therefore it is possible to compensate for the varying volume during the solidification in the cast part. Materials of this type are known from the prior art; EP 1 050 354 A1, EP 0 888 199 B1 and DE 196 42 838 A1 disclose such materials.

In the present invention, such a known material which causes an exothermic reaction is used as an encapsulation or embedding for the insert part to be cast in. The material is ignited through the contact between the exothermic material and the liquid casting material or as a result of the ignition temperature of the exothermic mass being reached. As a result, the insert part is heated up from both sides; this prevents rapid solidification of the casting material in the boundary region to the insert part, since the insert part loses its quenching action for the casting material. The temperature gradient between the casting material and the insert part is minimized. This in turn promotes the carbon diffusion between the casting material and the insert part, as a result of which it is possible to produce an integral or metallurgical bond.

The insert part is preferably produced from steel, copper, bronze, brass, aluminium or an aluminium alloy. The process or the composite cast part can be used in a versatile manner owing to the broad material selection.

The exothermic material preferably comprises a readily oxidizable metal, in particular aluminium and/or magnesium.

Moreover, it is advantageous that the exothermic material comprises an oxidant for the readily oxidizable metal, in particular iron(III) oxide.

The back-fill material used is preferably an oxide, in particular $SiO_2$. The back-fill material serves as filler material, which is mixed with the further substances such as aluminium and/or magnesium and also an oxidant.

The exothermic material preferably comprises a binder, which serves for the cohesion of the exothermic material. An alkali silicate is used as a preferred binder.

A preferred configuration consists in the fact that a cast iron, preferably GJS, GJL and/or GJV, is used as the casting material. By virtue of the insert part which has been cast in, it is possible to achieve a high strength and elongation at break at locations intended for this purpose in the cast component, or it is possible to provide the composite cast component with additional, positive properties for subsequent further treatment.

In the case of composite cast parts which have been produced by processes known from the prior art, the bonds between the casting material and the insert part are usually inadequate. Composite cast parts which have been produced by the process according to the invention have an improved integral bond between the materials.

The use of composite cast parts produced in this way affords a good alternative for substituting cast steel or welded steel structures with the advantage of the known cast iron alloys and the production processes therefor.

As a preferred embodiment, the casting material used is an aluminium alloy; as a result, it is possible, for example, to combine aluminium components with various metallic materials, as a result of which it is possible to utilize the advantage of the weight reduction owing to the lightweight aluminium.

It is preferable that the process according to the invention is employed with lost casting moulds.

This process makes it possible to use an insert part which has a sufficient thickness or wall thickness for making it possible to subject the insert part also to a heat treatment process or welding process after the casting process. Processes which are known from the prior art only make it possible to cast in a steel part which has very thin walls, in order to counter somewhat the rapid solidification and the hindered carbon diffusion owing to the contact between the steel part at room temperature and the casting material.

It is preferable that a hollow body is used as the insert part. The cavity is filled with the casting material and bonds integrally to the insert part. The outer surface of the insert part is encapsulated with the exothermic material or is embedded in the material. Owing to the exothermic reaction of the mass following contact with the molten mass, the mass also emits heat to the insert part, as a result of which there is a harmonized temperature gradient between the solidifying molten mass and the insert part. The insert part can also be bonded to the exothermic material on one side, or in the case of a hollow design from the inside. After the casting operation and removal from the mould, the exothermic material can readily be removed and the outer surface or the inner face of the insert part emerges. Reworking is subsequently possible, but in many cases is also not necessary since the dimensional accuracy and the surface condition are already of good quality. The process according to the invention is also of great interest from an economical point of view owing to the possible reduction of further machining steps. Furthermore, these processes give rise to extended possibilities for post-treating the cast component, e.g. welding or heat treating (also only partially on the insert part).

Composite cast parts of this type produced by the process according to the invention are suitable in particular for general mechanical engineering, for construction machines and for vehicle construction. It is thereby possible for different materials to be economically bonded to one another even in the case of high quantities and for the preferred properties of the individual materials to be combined with one another without the problem concerning an inadequate bond between the materials resulting from early solidification of the casting material arising.

BRIEF DESCRIPTION OF THE DRAWINGS

Exemplary embodiments of the invention will be described with reference to the figures, the invention not being limited merely to the exemplary embodiments. In the drawing.

DETAILED DESCRIPTION

Figure 1:
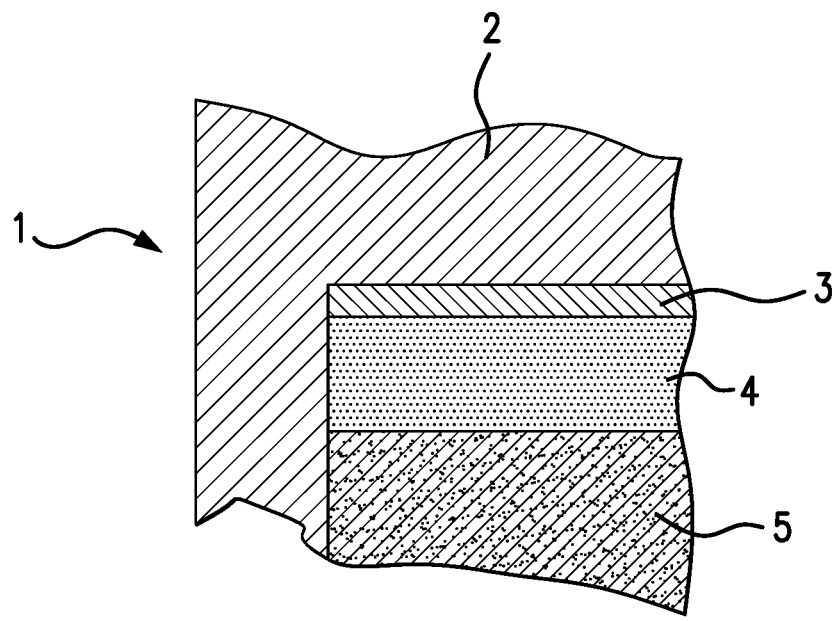
FIG. 1 shows a partial section of a casting mould with an inserted, encapsulated insert part.

FIG. 1 shows a partial section of a casting mould in which a composite cast part 1 has been moulded. The casting material 2 flows into the casting mould, which is formed by the moulding material 5 and in which an insert part 3 is inserted in order to enter into an integral or metallurgical bond with the casting material 2. The casting material 2, preferably GJS, GJL or GJV, flows into the casting mould formed by the moulding material 5. At the points at which the casting material 2 makes contact with the exothermic material 4, the latter ignites, as a result of which heat is discharged to the surroundings. The insert part is heated as a result and the temperature gradient between the solidifying molten mass and the insert part is reduced. Moreover, the carbon diffusion between the casting material 2 which makes direct contact with the insert part 3 and the insert part 3 is promoted. This achieves an integral or metallurgical bond at the points of direct contact between the insert part 3 and the casting material 2. After shaping, the exothermic material 4 can easily be removed from the insert part 3. The face(s) of the insert part 3 covered by the exothermic material 4 is or are free from casting material, and therefore reworking of the surface of the insert part is not absolutely necessary; this in turn means that the process according to the invention is of great interest from an economical point of view.

Figure 2:
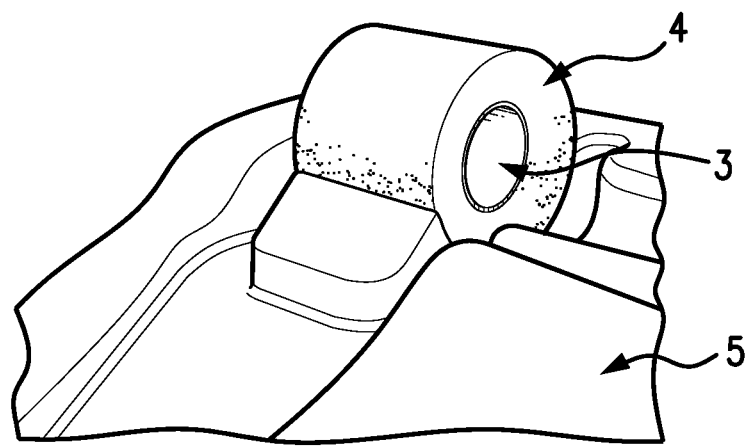
FIG. 2 shows a steel pipe encapsulated with exothermic material.
Figure 3:
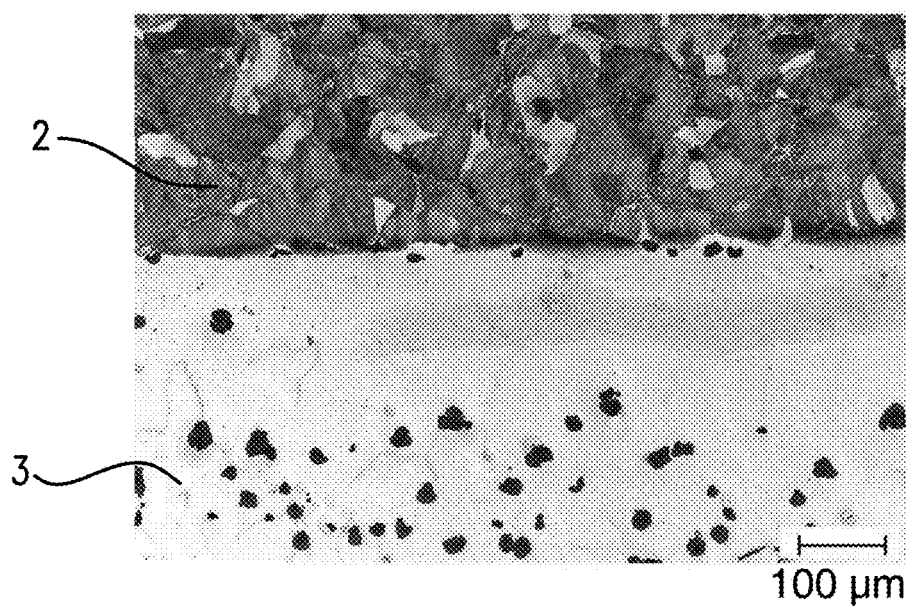
FIG. 3 shows a microsection through a section of the composite cast part.
Figure 4:
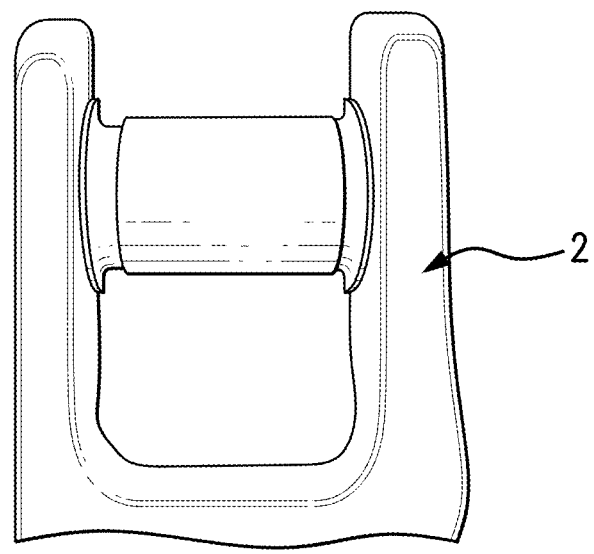
FIG. 4 shows a section of a composite cast component with a cast-in steel part.

A further exemplary embodiment is shown in FIGS. 2-4.

The insert part 3 used is a cylindrical steel pipe made of a high-carbon steel having wall thicknesses of 5 mm which is formed in exothermic material 4 with a defined wall thickness. This steel pipe 3 with the surrounding exothermic material 4 is inserted into the mould 5 to be cast, as can be seen from FIG. 2. The closed casting mould 5 is filled with molten mass 2 for producing a GJS, molten mass 2 flowing through the internal space of the steel pipe 3 and some of the exothermic material 4 being in direct contact with the molten mass. Once the ignition temperature of the exothermic material 4 has been reached, the latter emits heat to the surroundings and the steel pipe 3. The latter is thereby greatly heated and the temperature gradient between the steel pipe 3 and the solidifying molten mass 2 is reduced. This has a beneficial effect on the microstructure formation and on the carbon diffusion between the casting material 2 and the steel pipe 3 which proceeds on account of the differences in concentration. Owing to the incorporation of the carbon atoms in the interstices of the steel, the melting temperature is reduced and the pipe wall of the steel pipe 3 partially dissolves. Regions of the steel are carburized and as it were replaced by casting material. There is therefore a seamless transition between the casting material 2 and the steel pipe 3, as depicted in FIG. 3. FIG. 4 shows a section of the component with a cast-in steel pipe 3.

The invention claimed is:

1. A process for producing a composite cast part containing an insert part and casting material, wherein the insert part is integrally bonded to the casting material and the process comprises the following steps:
   producing the insert part;
   encapsulating or embedding at least one face of the insert part in an exothermic material;

inserting the encapsulated/embedded insert part into a casting mould; and filling the mould with molten casting material so as to flow the molten casting material on the insert part wherein the exothermic material ignites through contact with the flowing casting material or as a result of an ignition temperature of the exothermic material being reached, whereby a temperature gradient between the casting material and the insert part is reduced, and subsequent to filling the mould the at least one face of the insert part remain(s) free from casting material.

2. The process for producing a composite cast part according to claim 1, wherein the insert part is formed of steel.

3. The process for producing a composite cast part according to claim 1, wherein the exothermic material is formed of a readily oxidizable metal.

4. The process for producing a composite cast part according to claim 3, wherein the exothermic material comprises an oxidant for the readily oxidizable metal.

5. The process for producing a composite cast part according to claim 1, wherein the exothermic material comprises a back-fill material.

6. The process for producing a composite cast part according to claim 5, wherein the back-fill material is an oxide.

7. The process for producing a composite cast part according to claim 1, wherein the exothermic material comprises a binder.

8. The process for producing a composite cast part according to claim 1, wherein the casting material is a cast iron.

9. The process for producing a composite cast part according to claim 1, wherein the casting material is an aluminium alloy.

10. The process for producing a composite cast part according to claim 1, wherein the casting mould is a lost casting mould.

11. The process for producing a composite cast part according to claim 1, wherein the composite cast part is subjected to one of a heat treatment and a welding process at least on the insert part.

12. The process for producing a composite cast part according to claim 1, wherein the insert part is one of a hollow body and a free-form part.

13. A process for producing a composite cast part containing an insert part and casting material, wherein the insert part is integrally bonded to the casting material and the process comprises the following steps:

producing the insert part;

encapsulating or embedding at least one face of the insert part in an exothermic material;

inserting the encapsulated/embedded insert part into a casting mould; and filling the mould with molten casting material so as to flow the molten casting material on the insert part wherein the exothermic material ignites through contact with the flowing casting material or as a result of an ignition temperature of the exothermic material being reached, whereby a temperature gradient between the casting material and the insert part is reduced, and wherein the at least one face of the insert part is free from casting material after the filling step; and removing the exothermic material from the insert part.

14. A process for producing a composite cast part containing an insert part and casting material, wherein the insert part is integrally bonded to the casting material and the process comprises the following steps:

producing the insert part;

encapsulating or embedding a first face of the insert part in an exothermic material;

inserting the encapsulated/embedded insert part into a casting mould; and filling the mould with molten casting material so as to flow the molten casting material on the insert part wherein:

the molten casting material is flowed to make direct contact with the insert part on a second face of said insert part opposite the exothermic material;

the exothermic material ignites through contact with the flowing casting material or as a result of an ignition temperature of the exothermic material being reached, whereby a temperature gradient between the casting material and the insert part is reduced; and the first face of the insert part covered by the exothermic material is (are) free from casting material after the filling.

* * * * *